(12) United States Patent
Jang et al.

(10) Patent No.: US 10,202,296 B2
(45) Date of Patent: Feb. 12, 2019

(54) AERATION DEVICE

(71) Applicant: Sun Won Jang, Incheon (KR)

(72) Inventors: Sun Won Jang, Incheon (KR); Jin Il Jeong, Wonju-si (KR)

(73) Assignee: Sun Won Jang, Incheon (KR)

( * ) Notice: Subject to any disclaimer, the term of this patent is extended or adjusted under 35 U.S.C. 154(b) by 210 days.

(21) Appl. No.: 14/904,827

(22) PCT Filed: Jul. 15, 2014

(86) PCT No.: PCT/KR2014/006359
§ 371 (c)(1),
(2) Date: Jan. 13, 2016

(87) PCT Pub. No.: WO2015/009012
PCT Pub. Date: Jan. 22, 2015

(65) Prior Publication Data
US 2016/0207805 A1    Jul. 21, 2016

(30) Foreign Application Priority Data

Jul. 18, 2013  (KR) .................. 10-2013-0084978
Aug. 26, 2013  (KR) .................. 10-2013-0101098
(Continued)

(51) Int. Cl.
*C02F 3/12* (2006.01)
*C02F 7/00* (2006.01)
(Continued)

(52) U.S. Cl.
CPC ........ *C02F 3/1278* (2013.01); *B01F 3/04588* (2013.01); *B01F 7/00733* (2013.01);
(Continued)

(58) Field of Classification Search
CPC .... C02F 3/1278; C02F 7/00; C02F 2201/002; B01F 7/00733; B01F 3/04539;
(Continued)

(56) References Cited

U.S. PATENT DOCUMENTS 1,445,935 A * 2/1923 Pennington .............. B03D 1/16
                                                             209/169
2,246,559 A * 6/1941 Weinig ..................... B03D 1/16
                                                             209/169
(Continued)

FOREIGN PATENT DOCUMENTS

DE    3425791 A1 * 3/1985 .......... B01F 3/04588
DE    3407370 A1 * 8/1985 ........... A01K 63/042
(Continued)

OTHER PUBLICATIONS

EPO translation of Kurt et al. DE 34 17 039 published Nov. 14, 1985.*
(Continued)

*Primary Examiner* — Stephen Hobson
(74) *Attorney, Agent, or Firm* — LRK Patent Law Firm

(57) ABSTRACT

Aeration device includes a hollow casing having a motor therein; a mixing unit formed on front side of the casing and having a discharge hole formed in radial direction and an intake hole formed on front thereof; an impeller located inside the mixing unit and coupled to a driving shaft of the motor, the driving shaft extended to the mixing unit, so as to be rotated with the driving shaft, to generate flow in outward radial direction upon rotation, an air inflow unit having one side end located in front of the impeller and serving as an air inflow pipe for introducing air to the mixing unit; and an auxiliary intake unit located on front side of the impeller to be rotated with the driving shaft of the motor and inserted
(Continued)

into the air inflow unit to allow fluid in the air inflow unit to flow backward upon rotation.

14 Claims, 17 Drawing Sheets

(30) Foreign Application Priority Data

| Aug. 28, 2013 | (KR) | 10-2013-0102370 |
|---|---|---|
| Nov. 4, 2013 | (KR) | 10-2013-0132924 |
| Jan. 29, 2014 | (KR) | 10-2014-0011228 |

(51) Int. Cl.
   *B01F 7/00* (2006.01)
   *B01F 3/04* (2006.01)
   *F01D 5/16* (2006.01)
   *B05B 1/28* (2006.01)

(52) U.S. Cl.
   CPC ............ *C02F 7/00* (2013.01); *B01F 3/04539* (2013.01); *B01F 2003/04631* (2013.01); *B01F 2003/04645* (2013.01); *B01F 2003/04716* (2013.01); *B01F 2003/04723* (2013.01); *B05B 1/28* (2013.01); *C02F 2201/002* (2013.01); *F01D 5/16* (2013.01); *Y02W 10/15* (2015.05)

(58) Field of Classification Search
   CPC .. B01F 2003/04645; B01F 2003/04631; B01F 2003/04716; B01F 2003/04723; F01D 5/16; B05B 1/28; Y02W 10/15
   See application file for complete search history.

(56) References Cited

U.S. PATENT DOCUMENTS

| 2,928,661 | A | * | 3/1960 | MacLaren | B01F 3/04539 261/24 |
|---|---|---|---|---|---|
| 3,535,051 | A | * | 10/1970 | Turner | F04D 29/2266 415/104 |
| 3,973,866 | A | * | 8/1976 | Vaughan | F04D 7/045 241/46.11 |
| 4,117,044 | A | * | 9/1978 | Durda | B01F 3/04531 210/167.26 |
| 4,456,424 | A | * | 6/1984 | Araoka | E02F 3/90 415/121.1 |
| 4,728,256 | A | * | 3/1988 | Araoka | F04D 7/045 415/121.1 |
| 4,844,843 | A | * | 7/1989 | Rajendren | B01F 3/04539 261/30 |
| 5,011,372 | A | * | 4/1991 | Nigrelli | B01F 3/04773 239/23 |
| 5,076,757 | A | * | 12/1991 | Dorsch | F04D 7/045 415/110 |
| 5,256,032 | A | * | 10/1993 | Dorsch | F04D 7/045 415/121.1 |
| 5,456,580 | A | * | 10/1995 | Dorsch | B02C 18/0092 415/121.1 |
| 5,582,777 | A | * | 12/1996 | Vento | A01K 63/042 261/121.2 |
| 5,711,902 | A | * | 1/1998 | Hsu | B01F 3/04609 261/91 |
| 6,224,331 | B1 | * | 5/2001 | Hayward | F04D 7/045 415/121.1 |
| 6,394,423 | B1 | * | 5/2002 | Vento | B01F 3/04531 261/121.2 |
| 6,406,255 | B1 | * | 6/2002 | Angelle | B01D 21/0096 415/121.1 |
| 6,406,635 | B1 | * | 6/2002 | Smith | B23Q 11/0057 184/6.24 |
| 6,439,756 | B1 | * | 8/2002 | Forschner | B01F 3/04588 261/87 |
| 7,028,992 | B2 | * | 4/2006 | Rajendren | B01F 3/04539 261/28 |
| 7,125,221 | B2 | * | 10/2006 | Dorsch | F04D 7/045 415/121.1 |
| 8,105,017 | B2 | * | 1/2012 | Dorsch | F04D 29/2288 415/121.1 |
| 8,524,146 | B2 | * | 9/2013 | Cooper | C21C 1/06 266/217 |
| 8,657,564 | B2 | * | 2/2014 | Cuppetelli | F04D 29/2288 415/121.1 |
| 2006/0255482 | A1 | * | 11/2006 | Chevalier | B01F 3/04539 261/84 |
| 2016/0310914 | A1 | * | 10/2016 | Tsuei | A01K 63/042 |

FOREIGN PATENT DOCUMENTS

| DE | 3417039 | | * | 11/1985 | | |
|---|---|---|---|---|---|---|
| DE | 3417039 | A1 | * | 11/1985 | ........... | A01K 63/042 |
| DE | 3427584 | A1 | * | 2/1986 | ........... | B01F 3/04539 |
| JP | 2009-095756 | A | | 5/2009 | | |
| KR | 10-0512089 | B1 | | 9/2005 | | |
| KR | 10-0583052 | B1 | | 5/2006 | | |
| KR | 10-0753439 | B1 | | 8/2007 | | |
| KR | 10-0882818 | B1 | | 2/2009 | | |
| KR | 10-0942868 | B1 | | 2/2010 | | |
| KR | 10-2010-0046246 | A | | 5/2010 | | |
| KR | 10-2011-0040327 | A | | 4/2011 | | |
| KR | 10-2012-0028065 | | * | 3/2012 | | |
| KR | 10-2012-0028065 | A | | 3/2012 | | |
| KR | 10-2012-0092905 | A | | 8/2012 | | |
| KR | 10-2013-0020596 | A | | 2/2013 | | |
| KR | 10-1254873 | B1 | | 4/2013 | | |
| KR | 10-2013-0082266 | A | | 7/2013 | | |

OTHER PUBLICATIONS

Gue et al. "Development of low-noise axial cooling fans in a household refrigerator" Journal of Mechanical Science and Technology 25 (12) (2011) 2995~3004 published Dec. 2011.*

Bouv "Calculating water pressure changes as pipe size changes" accessed at <http://boards.straightdope.com/sdmb/showthread.php?t=439898> published Oct. 11, 2007.*

EPO translation of Joo et al. KR 2012/0028065 published Mar. 22, 2012.*

Search Report for International Application No. PCT/KR2014/006359.

* cited by examiner

【Figure 1】
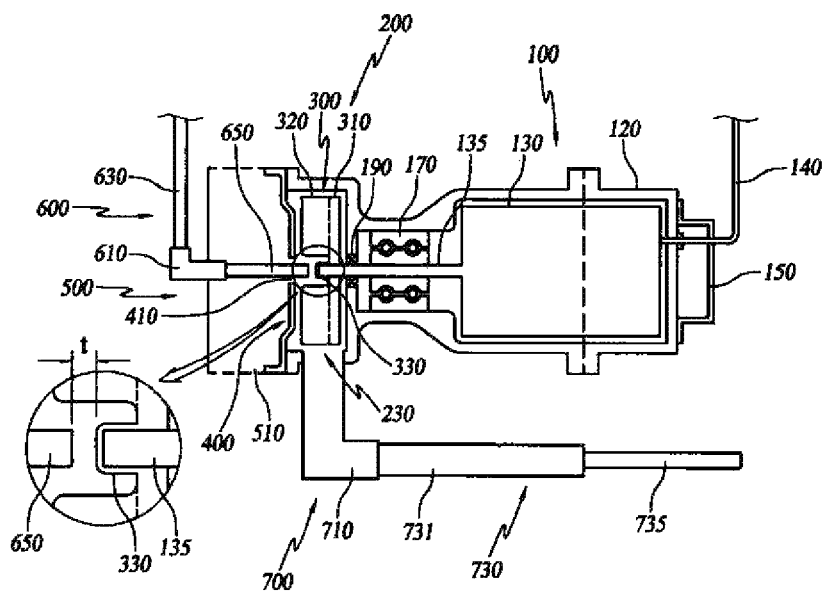
【Figure 2】
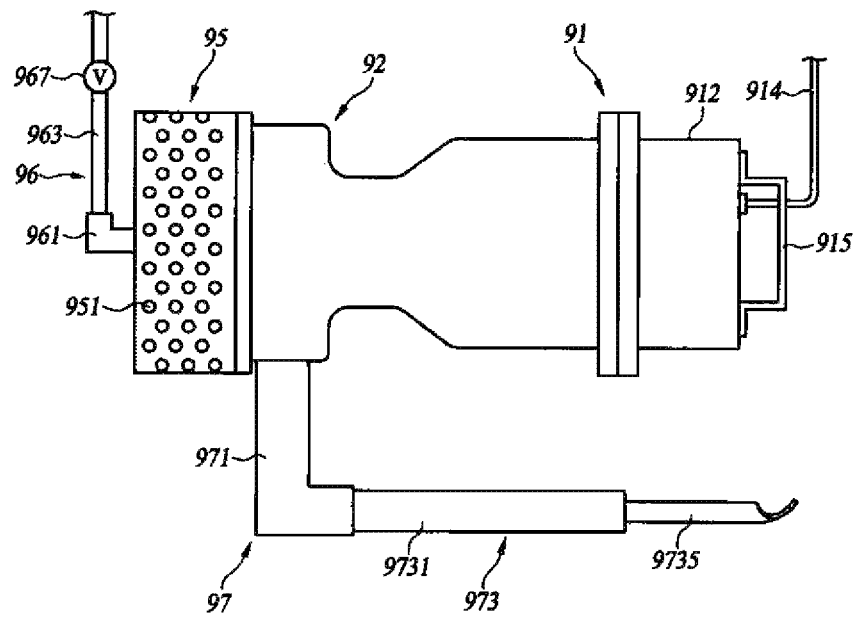

[Figure 3]
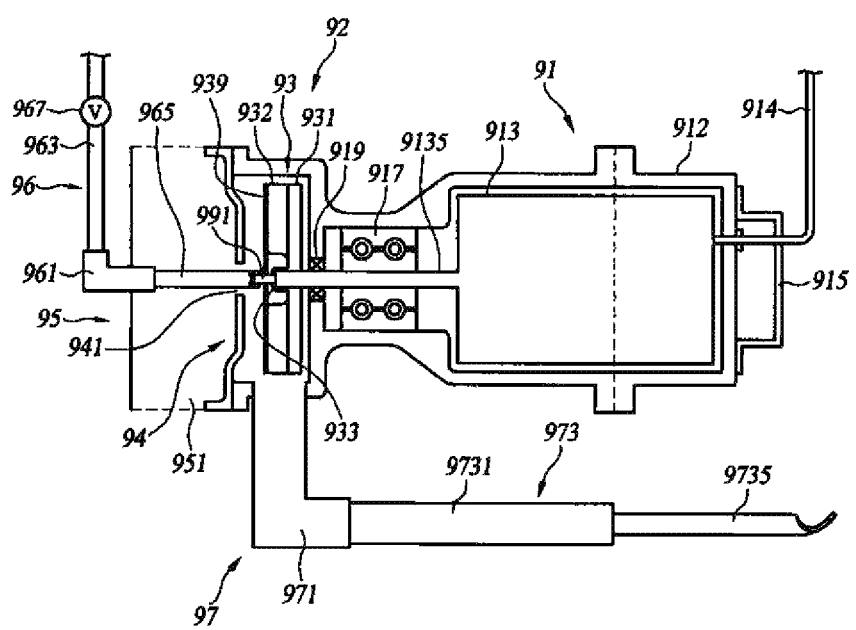

[Figure 4]
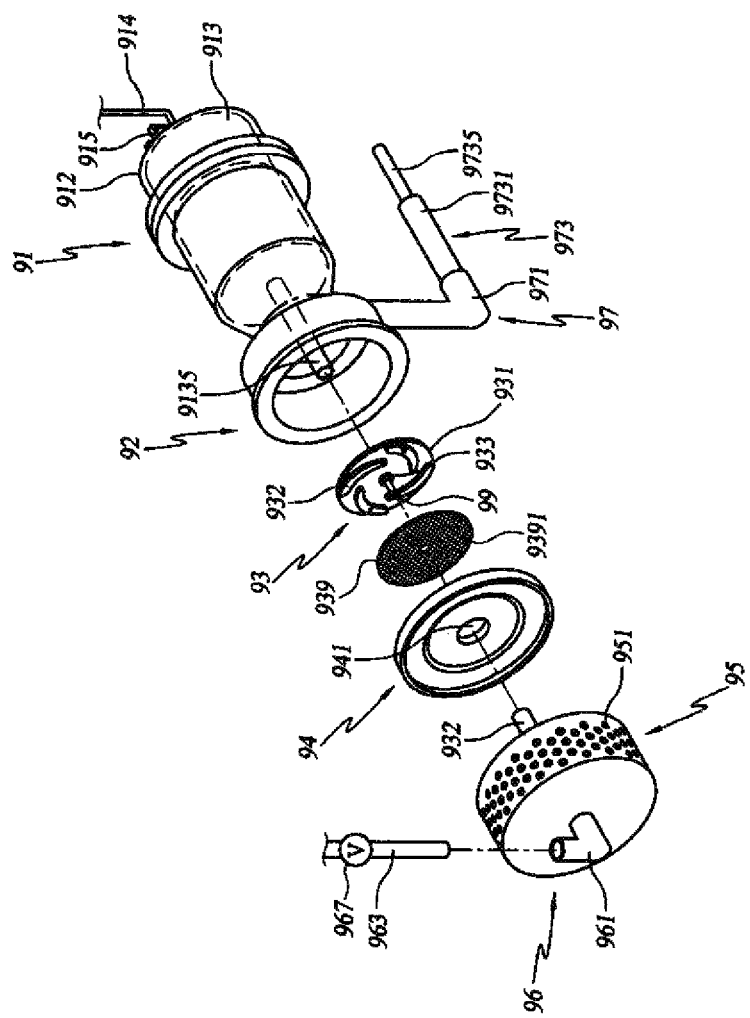

[Figure 7]
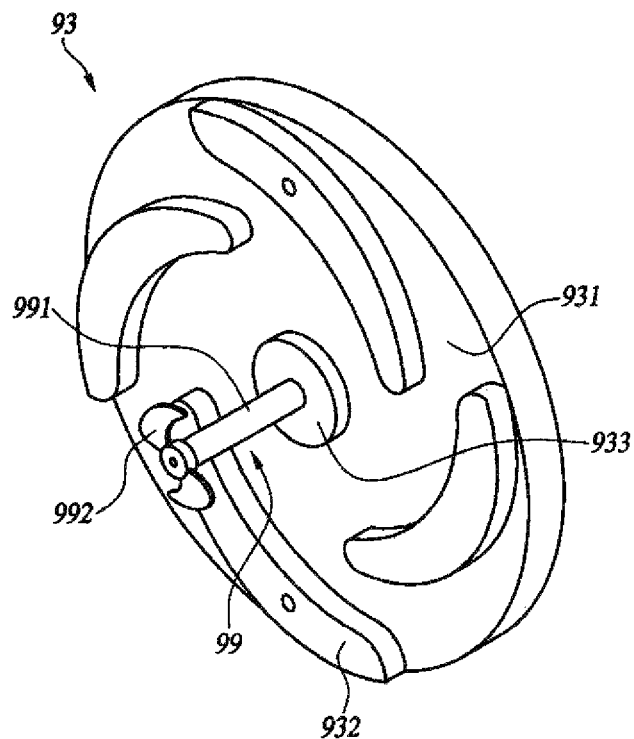
[Figure 8]
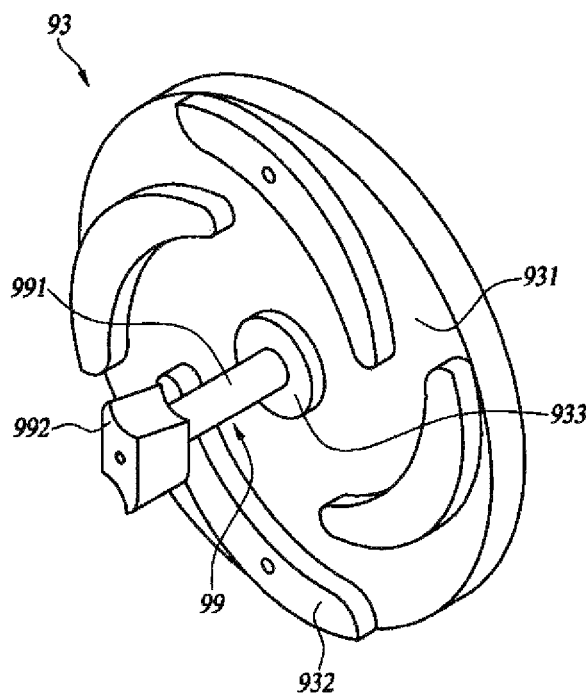

[Figure 9]
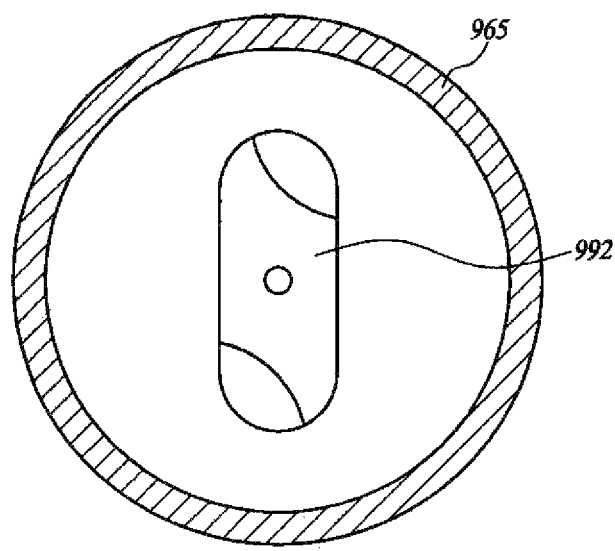
[Figure 10]
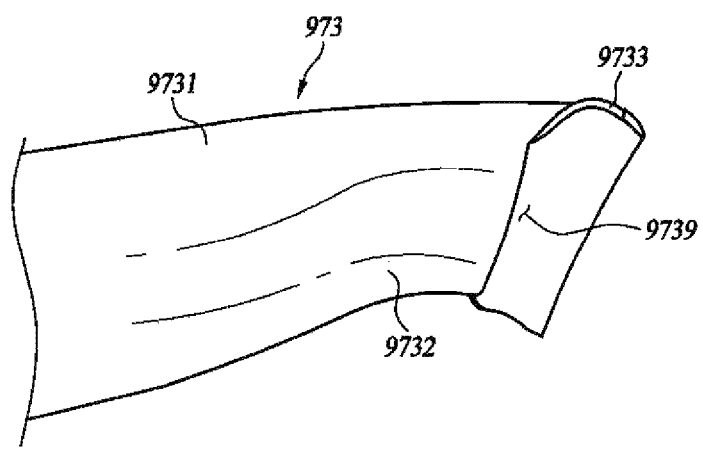

[Figure 11]
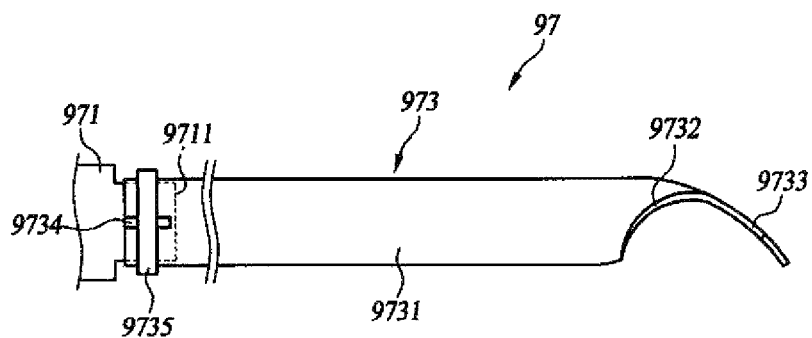
[Figure 12]
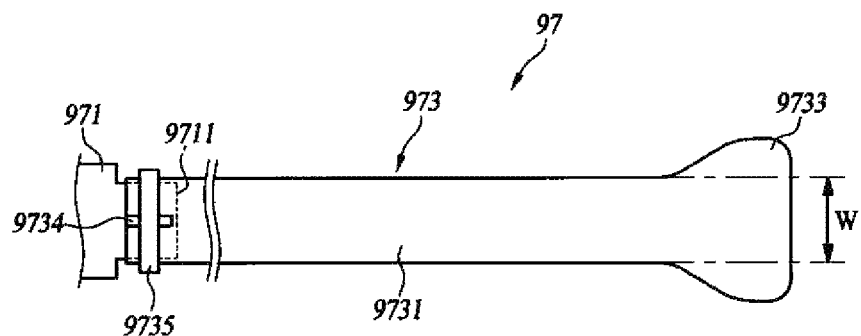
[Figure 13]
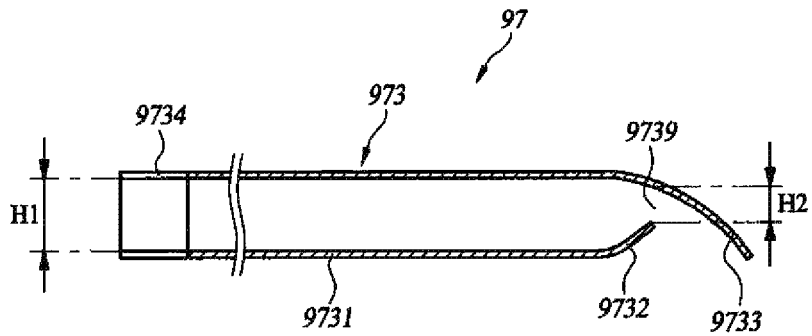

[Figure 14]
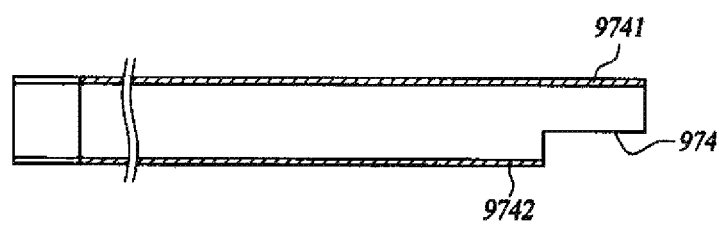
[Figure 15]
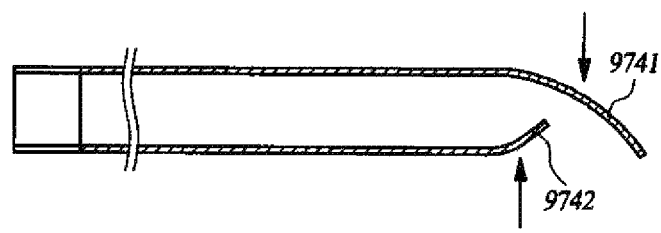

[Figure 16]
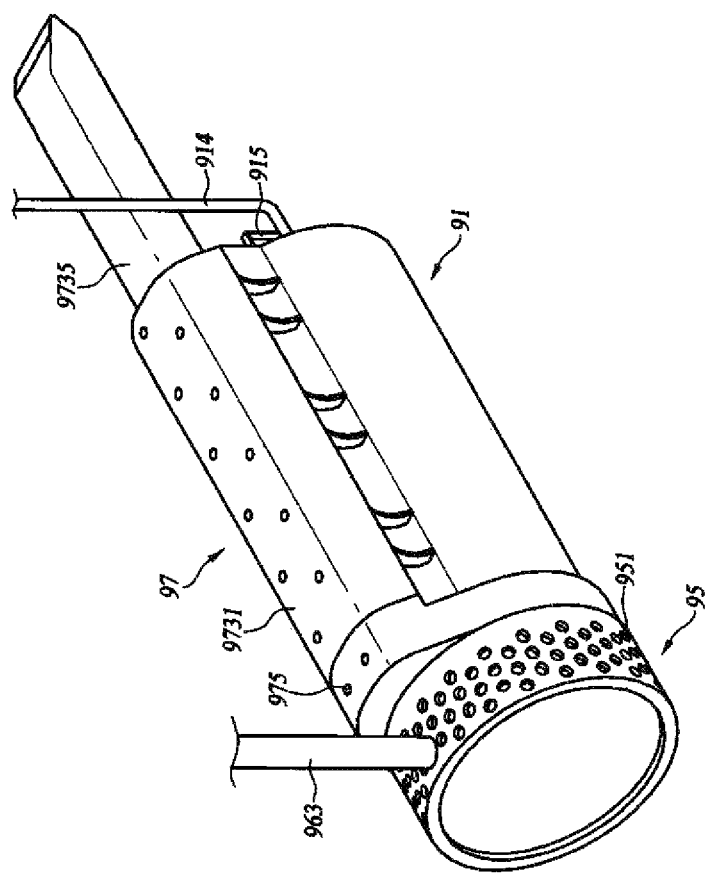

[Figure 17]
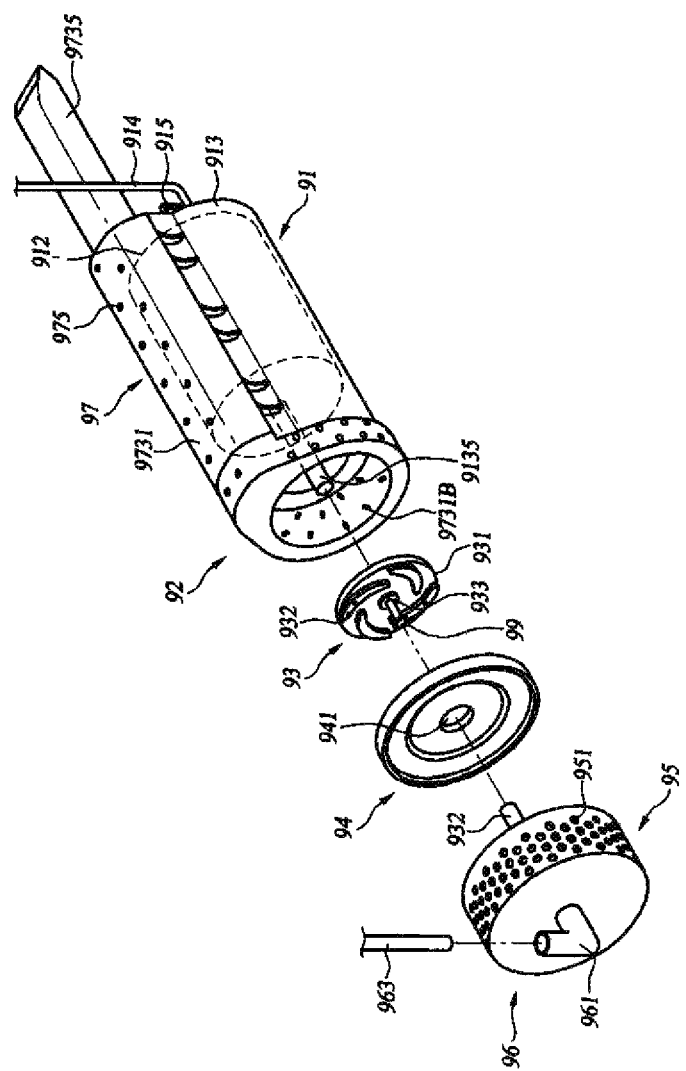

[Figure 18]
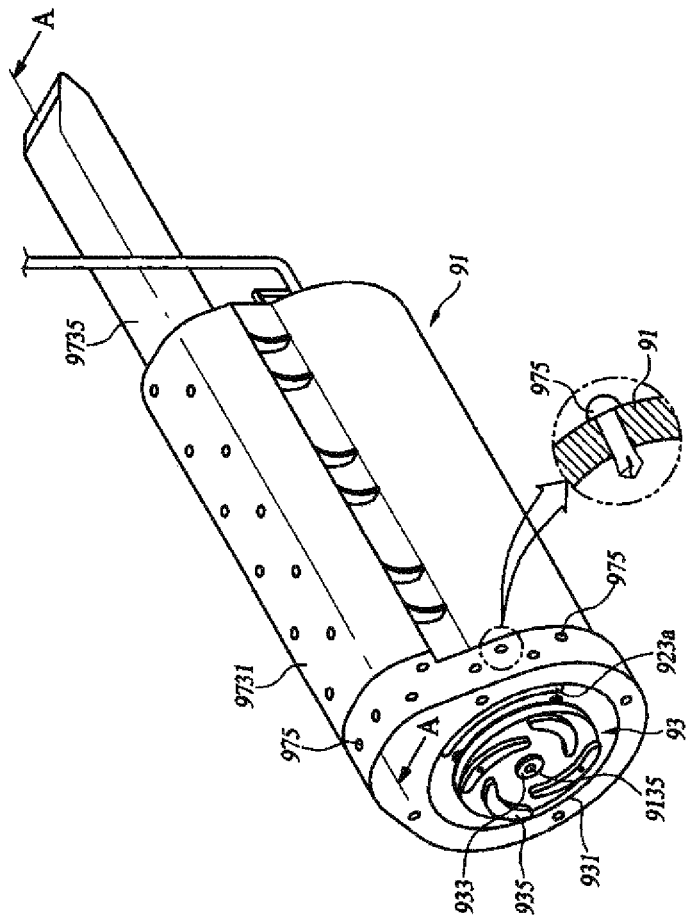
[Figure 19]
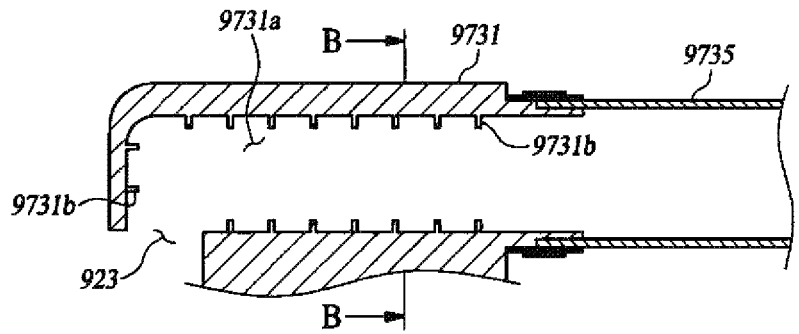

[Figure 20]
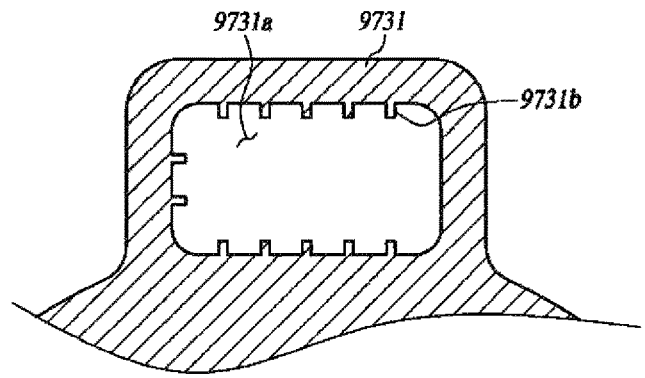
[Figure 21]
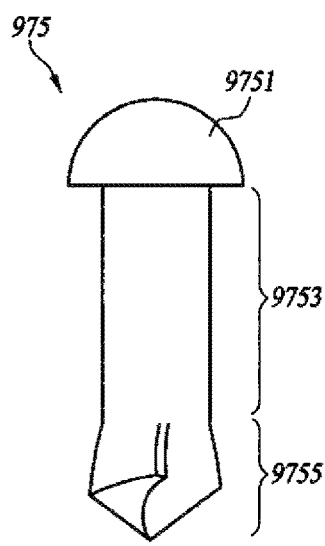
[Figure 22]
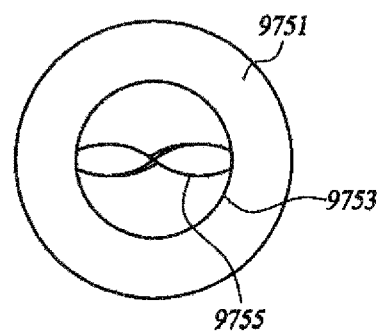

[Figure 23]
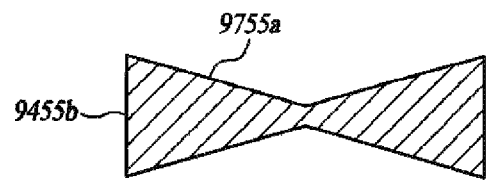
[Figure 24]
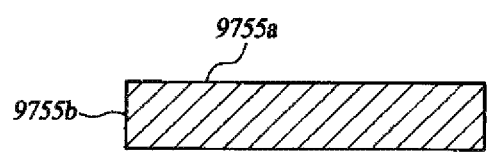

[Figure 25]
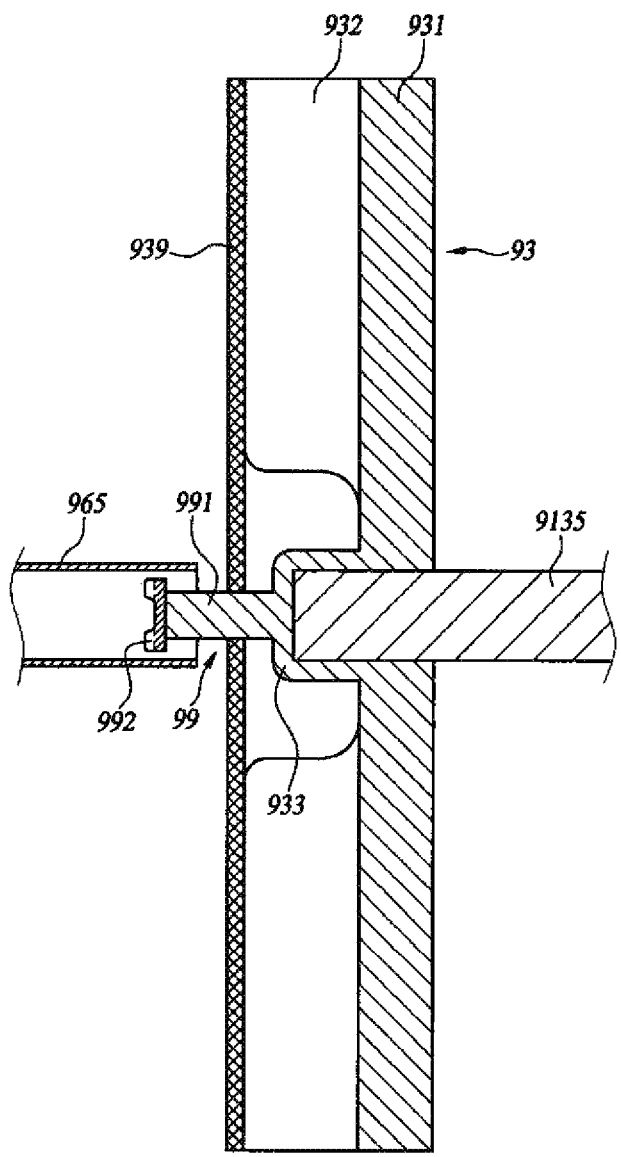

【Figure 26】
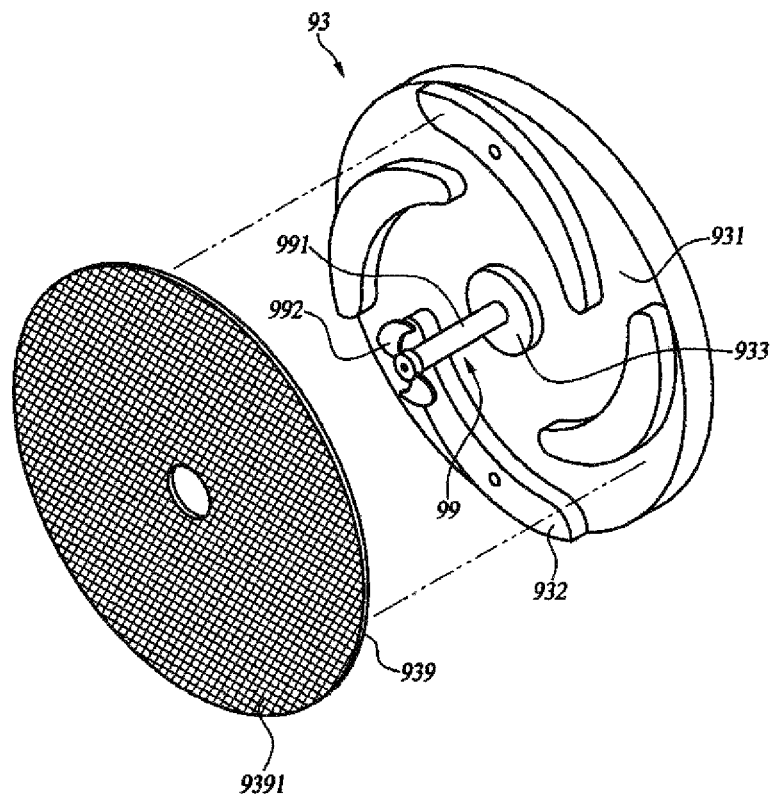
【Figure 27】
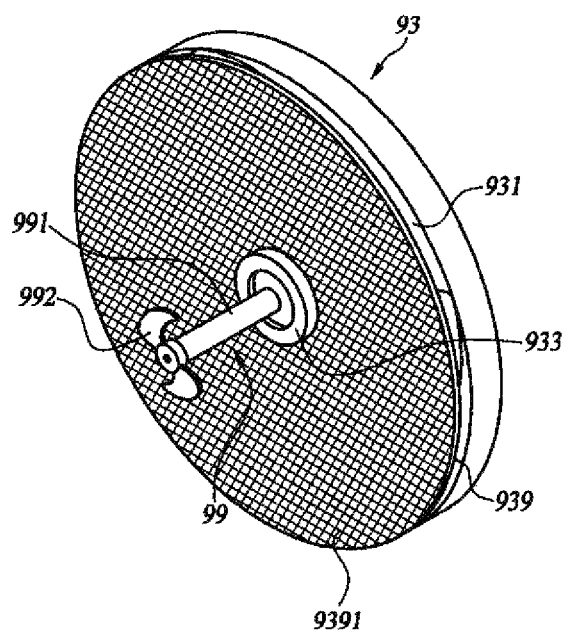

[Figure 28]
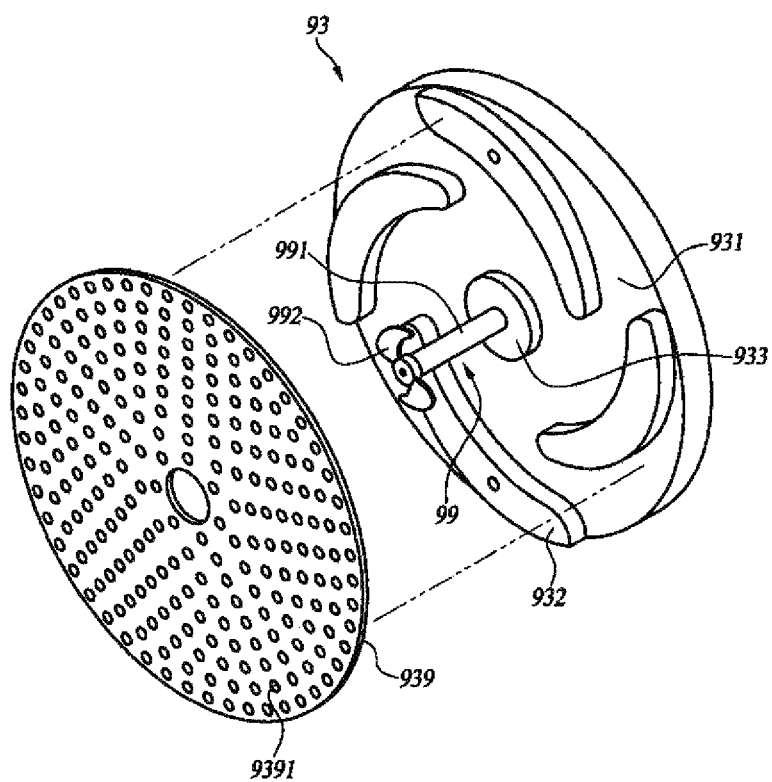

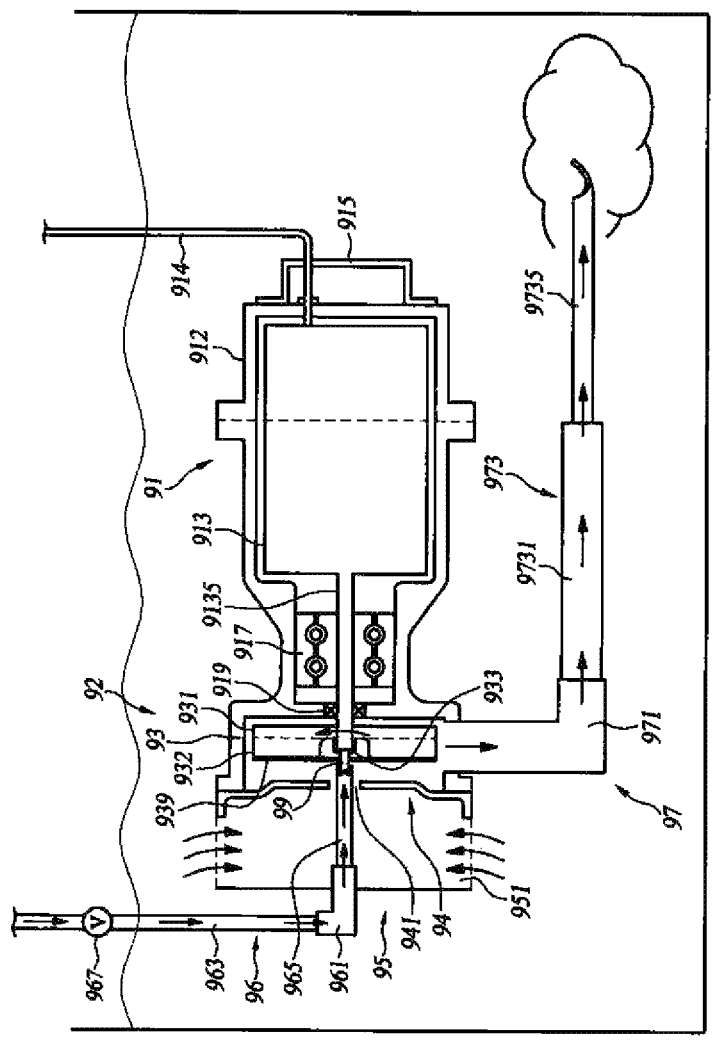
[Figure 29]

ation device in which an air inflow unit can be changed in position to introduce air even at the state where the aeration device is submerged into water to a relatively high depth.

AERATION DEVICE

CROSS-REFERENCE TO RELATED APPLICATIONS

This application is a U.S. National Stage entry from International Application No. PCT/KR2014/006359, filed on Jul. 15, 2014, which designates the United States, and which claims priority to Korean Patent Application Nos. 10-2013-0084978, filed on Jul. 18, 2013, 10-2013-0101098, filed on Aug. 26, 2013, 10-2013-0102370, filed on Aug. 28, 2013, 10-2013-0132924, filed on Nov. 4, 2013, and 10-2014-0011228, filed on Jan. 29, 2014, the disclosure of which is incorporated by reference herein in its entirety.

TECHNICAL FIELD

The present invention relates to an aeration device, and more particularly, to an aeration device that is capable of aerating wastewater upon organic wastewater treatment to increase an amount of dissolved oxygen, thus improving wastewater treatment efficiencies.

BACKGROUND ART

Generally, wastewater is aerated in organic wastewater treatment using microorganisms. If the wastewater is aerated, the amount of dissolved oxygen of the wastewater is increased to activate aerobic microorganisms and further to accelerate the removal of suspended materials and harmful gas, thus raising wastewater treatment efficiencies. Even the water in a tank of a fish farm is aerated, and in this case, an amount of dissolved oxygen is increased to prevent the water from being contaminated and further to help the growth of live fish. Further, the aeration prevents water bloom and red tide from occurring.

A conventional aeration device is disclosed in Korean Patent Registration No 1254873 (Apr. 9, 2013). FIG. 1 is a sectional view showing the conventional aeration device. As shown in FIG. 1, the conventional aeration device includes a hollow cylindrical casing 100, a mixing unit 200 formed in front of the casing 100, an impeller 300 located inside the mixing unit 200, a separator plate 400 located on the front side of the mixing unit 200, an intake housing 500 located in front of the separator plate 400, an air inflow unit 600 located to pass through the intake housing 500 and serving as an air inflow passage, and a discharge unit 700 located on the outer peripheral surface of the mixing unit 200.

The casing 100 has a motor 130 sealedly mounted therein, and a driving shaft 135 of the motor 130 protrudes forward. Further, the casing 100 has an openable cover 120 coupled to the rear side thereof, and the cover 120 is provided with a handle 150 and an electric wire 140 for supplying driving power to the motor 130.

The mixing unit 200 has a shape of a hollow cylinder open forward and includes a discharge hole 230 penetrated radially into the circumferential surface thereof. The driving shaft 135 of the motor 130 is extended forward from the rear of the mixing unit 200. The driving shaft 135 is rotatably supported against a bearing member 170 located inside the casing 100, and a sealing member 190 is located between the driving shaft 135 and the inner periphery of the mixing unit 200 at the front side of the bearing member 170.

The impeller 300 is coupled to the driving shaft 135 to generate a thrust force in the radial direction of the mixing unit 200 and includes a disc-shaped rotary plate 310, a support tap 330 having an insertion hole adapted to insert the driving shaft 135 thereinto, and a plurality of rotary wings 320 protruding forward from the rotary plate 310. The support tap 330 protrudes forward to form a gap in the radial direction between the inside end portions of the rotary wings 320 and the support tap 330. The impeller 300 is rotated unitarily with the driving shaft 135 of the motor 130 through the driving of the motor 130.

The separator plate 400 has a disc-shaped plate having an inflow hole 410 formed on the center portion thereof in such a manner as to be penetrated from the front to the rear. The intake housing 500 has a shape of a cylinder open on the rear side thereof and includes a plurality of intake holes 510 formed penetratedly in the radial direction on the cylindrical portion thereof in such a manner as to be spaced apart from each other along the circumferential direction thereof. The separator plate 400 is located between the intake housing 500 and the mixing unit 200.

The air inflow unit 600 is penetrated from the front of the intake housing 500 to the rear thereof and includes a hollow inflow tap 610 open on one side and the other side thereof, a hollow inflow pipe 630 connected to the front side of the inflow tap 610 in such a manner as to be open on one side and the other side thereof, and a hollow extension pipe 650 connected to the rear side of the inflow tap 610 in such a manner as to be extended toward the mixing unit 200. A gap 't' is formed in the longitudinal direction between the rear side end portion of the extension pipe 650 and the support tap 330. The inflow tap 610 has a bent structure.

The discharge unit 700 includes a hollow discharge tap 710 open on one side and the other side thereof in such a manner as to communicate with the discharge hole 230 and a hollow discharge pipe 730 open on one side and the other side thereof in such a manner as to be connected to the discharge tap 710. The discharge pipe 730 includes a large diameter portion 731 formed on the front portion thereof and a small diameter portion 735 formed on the rear portion thereof.

According to the conventional aeration device, water is filled in the inflow pipe 630 to the same height as the surface of water before the aeration device is driven, and if the motor 130 is rotated at the initial driving of the aeration device, the water filled in the inflow pipe 630 is all introduced. After that, air is introduced and mixed with the water passing through the intake holes 510.

If the conventional aeration device is installed at a relatively low depth from the surface of water, for example, if the air inflow unit 600 is submerged into water to a depth of 30 cm, the water filled in the inflow pipe 630 is sucked by the driving force of the motor 130 so that air is introduced through the air inflow unit 600. Contrarily, if the air inflow unit 600 is submerged into water to a depth of 50 cm or more, all the water filled in the inflow pipe 630 is not sucked so that air is not introduced through the air inflow unit 600. Accordingly, the conventional aeration device cannot be used at a high depth under water. That is, air and water are mixed only on the surface of water to discharge the mixed air and water through the discharge unit 700. So as to increase the depth, therefore, the motor 130 should have high power output.

DISCLOSURE

Technical Problem

Accordingly, the present invention has been made in view of the above-mentioned problems occurring in the prior art, and it is an object of the present invention to provide an aeration device that is capable of sucking the water filled in an inflow pipe introducing air, without having any separate means like a pump or a motor having high power output, to allow the air to be introduced through the inflow pipe, improving the structure of a discharge unit so that the discharge unit is manufactured easily and the air stays under water for a long period of time, mixing the water and air mixed in a mixing unit again by means of protrusions formed on the discharge unit to prevent the contact surfaces between the water and the air from being decreased during the discharging, controlling an amount of air introduced through an air adjusting valve, and increasing the mixing rate between the water and the air to improve the aeration performance.

Technical Solution

To accomplish the above-mentioned object, according to the present invention, there is provided an aeration device including: a hollow casing having a motor mounted therein; a mixing unit formed on the front side of the casing and having a discharge hole formed in a radial direction and an intake hole formed on the front thereof; an impeller located inside the mixing unit and coupled to a driving shaft of the motor, the driving shaft being extended to the mixing unit, in such a manner as to be rotated unitarily with the driving shaft, to generate a flow in an outward radial direction upon the rotation; an air inflow unit having one side end portion located in front of the impeller and serving as an air inflow pipe for introducing air to the mixing unit; and an auxiliary intake unit located on the front side of the impeller in such a manner as to be rotated unitarily with the driving shaft of the motor and adapted to be inserted into the air inflow unit in such a manner as to allow s fluid in the air inflow unit to flow backward upon the rotation.

According to the present invention, preferably, the auxiliary intake unit includes an extension shaft extended forward from the impeller and an auxiliary impeller located on the front end portion of the extension shaft in such a manner as to allow the fluid to flow backward upon the rotation.

According to the present invention, preferably, the impeller includes a support tap protruding forward from the center thereof in such a manner as to insert the end portion of the driving shaft thereinto by means of screw-fastening, and the auxiliary intake unit includes an extension shaft extended forward from the support tap and an auxiliary impeller located on the front end portion of the extension shaft in such a manner as to allow the fluid to flow backward upon the rotation.

According to the present invention, preferably, the impeller includes a center hole formed on the center thereof in such a manner as to pass the driving shaft therethrough, and the auxiliary intake unit includes a support tap screw-fastened to the end portion of the driving shaft protruding forward after passing through the impeller, an extension shaft extended forward from the support tap in such a manner as to be formed unitarily with the support tap, and an auxiliary impeller located on the front end portion of the extension shaft in such a manner as to allow the fluid to flow backward upon the rotation.

According to the present invention, preferably, the auxiliary impeller includes wings having a plurality of grooves formed concavedly thereon to generate the flow in the axial direction of the extension shaft upon the rotation.

According to the present invention, preferably, the auxiliary impeller is located inside the air inflow unit.

According to the present invention, preferably, the aeration device further includes a discharge unit formed on the mixing unit in such a manner as to communicate with the discharge hole, and the discharge unit includes a discharge member having a hollow pipe open on both ends thereof, the pipe having a sectional area reduction portion formed on the rear side thereof so that an internal flow sectional area is decreased as the pipe goes toward the rear side thereof in the longitudinal direction thereof.

According to the present invention, preferably, the discharge member includes a guide portion extended backward from the rear side end portion of the pipe on which an injection hole is formed, bent from one side end portion in the radial direction of the pipe toward the other side end portion hereof, and guiding the fluid injected through the injection hole in such a manner as to allow the fluid to flow in the radial direction.

According to the present invention, preferably, the guide portion is extended in the radial direction of the pipe to cover the injection hole and extended in the longitudinal direction of the pipe in such a manner as to be spaced apart from the injection hole.

According to the present invention, preferably, a sectional area reduction rate generated through the sectional area reduction portion is in the range of 70 to 80%.

According to the present invention, preferably, the discharge pipe includes a slit formed in the longitudinal direction on the end portion opposite to the discharge hole of the pipe.

According to the present invention, preferably, the mixing unit includes a plurality of protrusions protruding therefrom in such a manner as to come into contact with the fluid.

According to the present invention, preferably, the aeration device further includes a discharge unit formed on the mixing unit in such a manner as to communicate with the discharge hole, and the discharge unit includes a hollow discharge pipe Open on one side and the other side thereof in such a manner as to communicate with the mixing unit on one end thereof and to communicate with the outside on the other end thereof, the discharge pipe having the plurality of protrusions protruding therefrom.

According to the present invention, preferably, the mixing unit comprises a guide groove formed concavedly on the rear side surface thereof in the circumferential direction thereof in such a manner as to communicate with the discharge pipe, the guide groove having the plurality of protrusions protruding therefrom.

According to the present invention, preferably, the protrusions are formed crossedly with respect to the flow direction of the fluid.

According to the present invention, preferably, the protrusions are formed by means of protrusion members inserted into the inside from the outside.

According to the present invention, preferably, each protrusion member includes a lower end portion having a sectional shape of a rectangle having two long sides and two short sides.

According to the present invention, preferably, each long side is formed concavedly on the center thereof.

According to the present invention, preferably, the air inflow unit includes an air adjusting valve adapted to control an amount of air introduced therethrough.

According to the present invention, preferably, the impeller includes a mixing accelerating unit located in front thereof in such a manner as to be rotated unitarily with the driving shaft, the mixing accelerating unit having a plurality of through holes penetrated from the front to the rear.

According to the present invention, preferably, the mixing accelerating unit has a shape of a mesh.

According to the present invention, preferably, the impeller includes a disc-shaped rotary plate and a plurality of rotary wings protruding forward from the rotary plate, and the mixing accelerating unit is fixedly coupled to the front end surfaces of rotary wings of the impeller 93.

Advantageous Effects

According to the present invention, the aeration device can improve the air intake force so as to suck the water filled in the inflow pipe introducing air at the beginning of starting, thus performing the aeration efficiently even in deep water, can locate air bubbles discharged with the water in a downward direction, thus making the air stay under water for a long period of time, can mix the water and air mixed in the mixing unit again by means of the protrusions formed on the discharge unit, thus preventing the contact surfaces between the water and the air from being decreased during the discharging to increase the amount of dissolved oxygen, can control an amount of air introduced through the air adjusting valve, thus efficiently performing the aeration, and can increase the mixing rate between the water and the air, thus improving the aeration performance to allow aerobic microorganisms to be continuously cultivated and further to accelerate aerobic fermentation.

DESCRIPTION OF DRAWINGS

FIG. 1 is a sectional view showing a conventional aeration device.

FIG. 2 is a side view showing an aeration device according to a first embodiment of the present invention.

FIG. 3 is a sectional view showing the aeration device according to the first embodiment of the present invention.

FIG. 4 is an exploded perspective view showing the aeration device according to the first embodiment of the Present invention.

FIG. 7 is a perspective view showing the impeller and auxiliary intake unit of the aeration device according to the first embodiment of the present invention.

FIG. 8 is a perspective view showing other examples of the impeller and auxiliary intake unit of FIG. 7.

FIG. 9 is a sectional view showing the state where the auxiliary intake unit of FIG. 8 is inserted into an extension pipe.

FIG. 10 is a perspective view showing a portion of a discharge unit of the aeration device according to the first embodiment of the present invention.

FIG. 11 is a side view showing the discharge unit of the aeration device according to the first embodiment of the present invention.

FIG. 12 is a plan view showing the discharge unit of the aeration device according to the first embodiment of the present invention.

FIG. 13 is a side sectional view showing the discharge unit of the aeration device according to the first embodiment of the present invention.

FIGS. 14 and 15 are side sectional views showing the processes for manufacturing the discharge member of the aeration device according to the first embodiment of the Present invention.

FIG. 16 is a perspective view showing an aeration device according to a second embodiment of the present invention.

FIG. 17 is an exploded perspective view showing the aeration device of FIG. 16.

FIG. 18 is a perspective view showing a casing, a separator plate, an impeller, and a discharge unit of the aeration device of FIG. 16.

FIG. 19 is a sectional view taken along the line A-A of FIG. 18.

FIG. 20 is a sectional view taken along the line B-B of FIG. 19.

FIG. 21 is a front view showing a protrusion member of the aeration device of FIG. 16.

FIG. 22 is a bottom view showing the protrusion member of FIG. 21.

FIG. 23 is a sectional view showing the lower end portion of the protrusion member of FIG. 21.

FIG. 24 is a sectional view showing a variation example of the section of the lower end portion of FIG. 21.

FIG. 25 is an enlarged sectional view showing the impeller and the mixing accelerating unit of the aeration device of FIG. 4.

FIG. 26 is a separate perspective view showing the impeller and the mixing accelerating unit of the aeration device of FIG. 4.

FIG. 27 is a perspective view showing the coupled state of the impeller and the mixing accelerating unit of the aeration device of FIG. 4.

FIG. 28 is a separate perspective view showing a variation example of the impeller and the mixing accelerating unit of FIG. 26.

FIG. 29 is a sectional view showing the operating state of the aeration device of FIG. 4.

MODE FOR INVENTION

Hereinafter, an explanation on an aeration device according to the present invention will be in detail given with reference to attached drawings.

Figure 5:
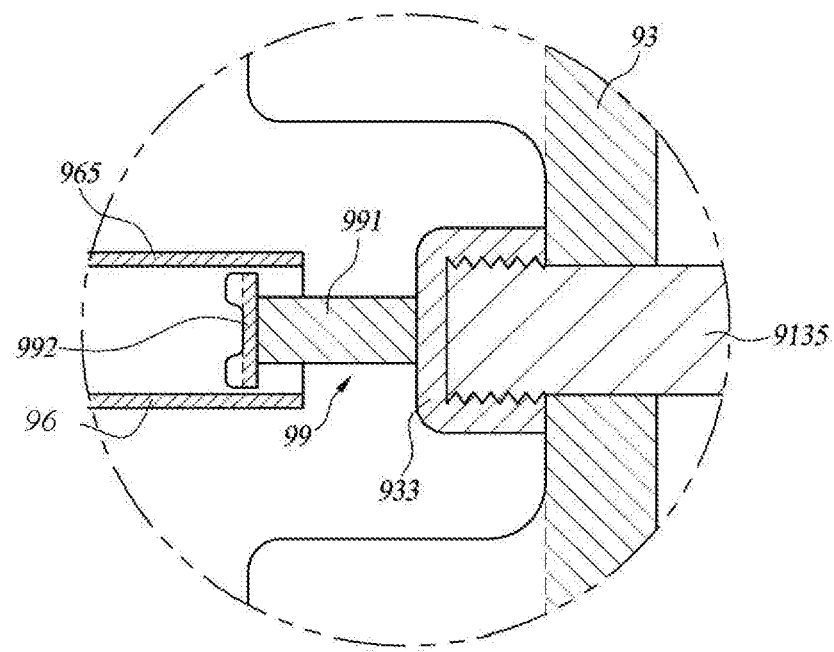
FIG. 5 is an enlarged sectional view showing an auxiliary intake unit of FIG. 3.
Figure 6:
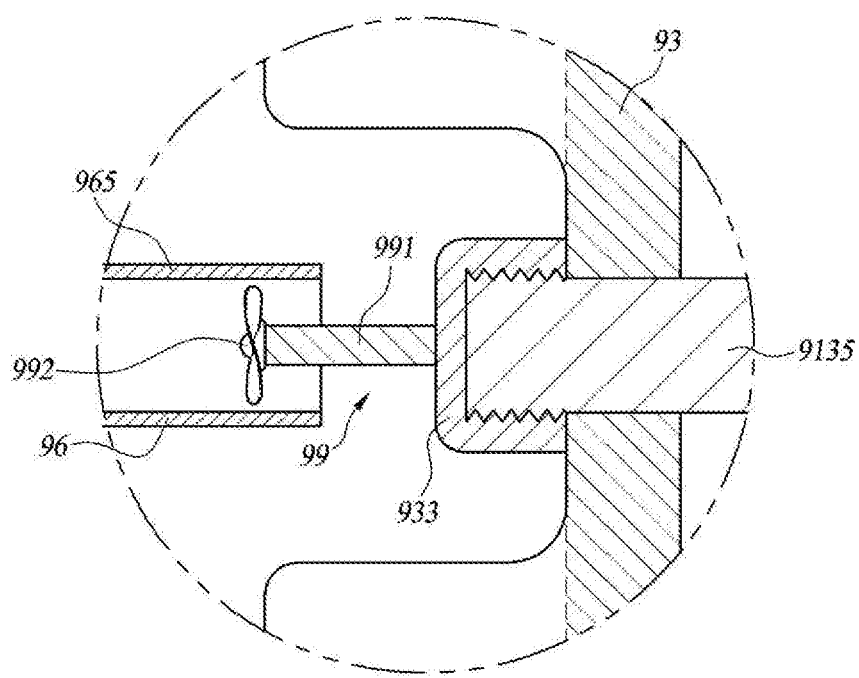
FIG. 6 is an enlarged sectional view showing another example of the auxiliary intake unit of FIG. 3.

FIG. 2 is a side view showing an aeration device according to a first embodiment of the present invention, FIG. 3 is a sectional view showing the aeration device according to the first embodiment of the present invention, FIG. 4 is an exploded perspective view showing the aeration device according to the first embodiment of the present invention, FIG. 5 is an enlarged sectional view showing an auxiliary intake unit of FIG. 3, FIG. 6 is an enlarged sectional view showing another example of the auxiliary intake unit of FIG. 3, FIG. 7 is a perspective view showing the impeller and auxiliary intake unit of the aeration device according to the first embodiment of the present invention, FIG. 8 is a perspective view showing other examples of the impeller and auxiliary intake unit of FIG. 7, FIG. 9 is a sectional view showing the state where the auxiliary intake unit of FIG. 8 is inserted into an extension pipe, FIG. 10 is a perspective view showing a portion of a discharge unit of the aeration device according to the first embodiment of the present invention, FIG. 11 is a side view showing the discharge unit of the aeration device according to the first embodiment of the present invention, FIG. 12 is a plan view showing the discharge unit of the aeration device according to the first embodiment of the present invention, FIG. 13 is a side sectional view showing the discharge unit of the aeration device according to the first embodiment of the present invention, FIGS. 14 and 15 are side sectional views showing the processes for manufacturing the discharge member of the aeration device according to the first embodiment of the present invention, FIG. 16 is a perspective view showing an aeration device according to a second embodiment of the present invention, FIG. 17 is an exploded perspective view showing the aeration device of FIG. 16, FIG. 18 is a perspective view showing a casing, a separator plate, an impeller, and a discharge unit of the aeration device of FIG. 16, FIG. 19 is a sectional view taken along the line A-A of FIG. 19, FIG. 20 is a sectional view taken along the line B-B of FIG. 19, FIG. 21 is a front view showing a protrusion member of the aeration device of FIG. 16, FIG. 22 is a bottom view showing the protrusion member of FIG. 21, FIG. 23 is a sectional view showing the lower end portion of the protrusion member of FIG. 21, FIG. 24 is a sectional view showing a variation example of the section of the lower end portion of FIG. 21, FIG. 25 is an enlarged sectional view showing the impeller and the mixing accelerating unit of the aeration device of FIG. 4, FIG. 26 is a separate perspective view showing the impeller and the mixing accelerating unit of the aeration device of FIG. 4, FIG. 27 is a perspective view showing the coupled state of the impeller and the mixing accelerating unit of the aeration device of FIG. 4, FIG. 28 is a separate perspective view showing a variation example of the impeller and the mixing accelerating unit of FIG. 26, and FIG. 29 is a sectional view showing the operating state of the aeration device of FIG. 4.

In FIG. 3, hereinafter, a left direction indicates a 'forward' direction, a right direction a 'backward' direction, a direction from the front side to the rear side a 'downward' direction, a vertical direction a 'radial' direction, a horizontal direction a 'longitudinal' direction, and a direction distant from a driving shaft 9135 in the radial direction an 'outward radial direction'. In the drawings, the internal structure of a motor 913 is not illustrated.

As shown in FIGS. 2 to 4 and FIG. 29, an aeration device according to a first embodiment of the present invention is installed under water to introduce external air, mix the external air with water, and discharge the mixed air and water, and the aeration device includes a hollow casing 91, a mixing unit 92 formed on the front side of the casing 91, an impeller 93 located inside the mixing unit 92, a separator plate 94 located on the front side of the mixing unit 92, an intake housing 95 located in front of the separator plate 94, an air inflow unit 96 extended toward the mixing unit 92 to pass through the intake housing 95 and serving as an air inflow passage, a discharge unit 97 communicating with the mixing unit 92 to discharge the water and air mixed with each other, and an auxiliary intake unit 99 located on the front side of the impeller 93 in such a manner as to be rotated unitarily with a driving shaft 135 of a motor 130.

The air inflow unit 96 includes a portion extended in the longitudinal direction and a portion extended in the radial direction. The portion extended in the radial direction is not necessarily extended vertically with respect to the portion extended in the longitudinal direction, and accordingly, only if the end of the air inflow unit 96 is located outside the water surface, the Portion extended in the radial direction may be extended at an obtuse or acute angle with respect to the portion extended in the longitudinal direction.

The motor 913 is located inside the casing 91, and the driving shaft 9135 of the motor 913 is extended forward toward the mixing unit 92 from the motor 913. The end of the driving shaft 9135 is located inside the mixing unit 92. The casing 91 has an openable cover 912 screw-fastened to the rear side thereof in such a manner as to form a unitary body therewith, and the cover 912 is provided with a loop-shaped handle 915. Further, an electric wire 914 for supplying driving power to the motor 913 is connected to the motor 913 via the cover 912.

The mixing unit 92 is a space formed in front of the motor 912, and the front portion of the casing 91 is concavedly open forward, which becomes the mixing unit 92. The mixing unit 92 is the space formed between the cylindrical portion concavedly open forward and the separator plate 94 coupled to the open portion of the cylindrical portion. The mixing unit 92 has a discharge hole 923 formed on the circumferential surface of the cylindrical portion thereof. The discharge hole 923 is formed to have an inclination angle with respect to the circumferential direction, and the mixing unit 92 has a groove formed concavedly on the inner cylindrical portion thereof toward the discharge hole 923 in the circumferential direction so as to guide the flow of a fluid to the discharge hole 923. The mixing unit 92 has a through hole formed penetratedly from a front to a rear on the center portion thereof. The through hole may become an inflow hole 941 of the separator plate 94.

The mixing unit 92 is formed on the front of the casing 91. The driving shaft 9135 of the motor 913 is extended to the rear side of the mixing unit 92. The mixing unit 92 is formed unitarily with the casing 91 on the front of the casing 91, and the front end of the driving shaft 9135 of the motor 913 is extended and located inside the mixing unit 92.

The driving shaft 9135 is rotatably supported against a bearing member 917 located inside the casing 91, and a sealing member 919 is located between the driving shaft 9135 and the inner periphery of the casing 91 in front of the bearing member 917.

The impeller 93 is rotated unitarily with the driving shaft 9135 of the motor 913 and fitted to the driving shaft 9135 extended to the mixing unit 92 in such a manner as to be rotatable within the mixing unit 92. While the impeller 93 is being rotated, the flow of fluid is generated in the radial direction of the mixing unit 92. The impeller 93 is coupled to the driving shaft 9135 to generate a thrust force in the radial direction of the mixing unit 92 and includes a disc-shaped rotary plate 931 and a plurality of rotary wings 932 protruding forward from the rotary plate 931. The impeller 93 is not limited to the above-mentioned shape, but may have a structure of generating the flow of fluid in the outward radial direction.

The air introduced through the air inflow unit 96 and the water introduced through the inflow hole 941 of the separator plate 94 are mixed with each other by means of the rotation of the impeller 93 and thus flow in the radial direction of the mixing unit 92.

The rotary wings 932 radially protrude forward from the rotary plate 931 in such a manner as to be spirally formed to have convex curves toward the outward radial direction. If the impeller 93 is rotated by means of the driving of the motor 913, the flow of fluid occurs in the radial direction approximately perpendicular to the driving shaft 9135.

The separator plate 94 has a disc-shaped plate having the inflow hole 941 formed on the center portion thereof in such a manner as to be penetrated from the front to the rear. The size of the inflow hole 941 is smaller than the distance between the inside end portions of the rotary wings 932. If the inflow hole 941 is circular, the size of the inflow hole 941 is smaller than the distance between the inside end portions of the rotary wings 932.

The intake housing 95 has a shape of a cup open on the rear side thereof and is located in front of the mixing unit 92. The intake housing 95 has a plurality of intake holes 951 formed penetratedly in the radial direction thereof on the cylindrical portion thereof in such a manner as to be spaced apart from each other along the circumferential and longitudinal directions thereof. The intake holes 951 may be formed on the front surface of the intake housing 95. The intake housing 95 is coupled to the front side of the separator plate 94. The intake housing 95 is coupled to the separator plate 94 by means of the fastening of bolts and nuts arranged in the circumferential direction thereof at regular intervals. The bottom portion of the cup-shaped cylindrical portion of the intake housing 95 is spaced apart from the separator plate 94 in front of the separator plate 94. The section of the intake housing 95 is not limited to have the circular shape, and it may have a polygonal shape.

The air inflow unit 96 is penetrated from a front and a rear in such a manner as to pass through the underside surface of the intake housing 95. The air inflow unit 96 is penetrated into the intake housing 95 in the longitudinal direction in such a manner as to be extended toward the mixing unit 92 and has a portion extended in the radial direction from the outside of the intake housing 95. However, the air inflow unit 96 is not limited to the above-mentioned structure, and it may be extended from a front to a rear after passing through the side periphery of the intake housing 95. The air inflow unit 96 has a hollow inflow tap 961 having a bent structure, a hollow extension pipe 965 connected to one side of the inflow tap 961, and a hollow inflow pipe 963 connected to the other side of the inflow tap 961. When the air inflow unit 96 is installed, the extension pipe 965 is extended in the longitudinal direction toward the impeller 93, and the inflow pipe 963 is extended in the radial direction. The end portion of the extension pipe 965 is located in front of the separator plate 94 in such a manner as to be adjacent to the inflow hole 941 or located within the mixing unit 92 in such a manner as to pass through the inflow hole 941. The inflow tap 961 is fixedly mounted on the intake housing 95 by means of welding so that one side thereof is located toward the mixing unit 92 and the other side thereof toward the outside of the radial direction. The inflow tap 961 may be located between the bottom surface of the intake housing 95 and the separator plate 94 so that the inflow pipe 963 is penetrated into the cylindrical portion of the intake housing 95 in the radial direction. In this case, the inflow pipe 963 is coupled to the cylindrical portion of the intake housing 95 by means of welding.

The air inflow unit 96 is penetrated from the front of the intake housing 95 to the rear thereof and includes the hollow inflow tap 961 having the bent structure open on one side and the other side thereof, the hollow inflow pipe 963 connected to the front side of the inflow tap 961 in such a manner as to be extended in the radial direction, and the hollow extension pipe 965 connected to the rear side of the inflow tap 961 in such a manner as to be extended toward the mixing unit 92 in the longitudinal direction.

The extension pipe 965 is extended backward in such a manner as to pass through the inflow hole 941. A gap is formed in the radial direction between the extension pipe 965 and the inflow hole 941. The air inflow unit 96 is located to expose one side end portion of the inflow pipe 963 to the air, thus allowing air to be introduced therethrough. The introduced air passes through the inflow tap 961 and the extension pipe 965 and flows toward the impeller 93. The air introduced through the extension pipe 965 flows to the mixing unit 92, mixes with the water in the mixing unit 92, and flows radially by means of the rotation of the impeller 93. The water and air are mixed with each other, flow radially, and are then discharged through the discharge hole 923 formed on the mixing unit 92.

The discharge unit 97 is a hollow Pipe connected to the discharge hole 923 formed on the outer peripheral surface of the mixing unit 92 and serves to discharge the air and water flowing through the discharge hole 923 of the mixing unit 92 therethrough. The discharge unit 97 includes a hollow discharge tap 971 coupled to the discharge hole 923 by means of screw-fastening and a hollow discharge pipe 973 connected to the discharge tap 971. The discharge pipe 973 includes a large diameter portion 9731 formed on the front portion thereof and a small diameter portion 9735 formed on the rear portion thereof, and the flow sectional area of the small diameter portion 9735 is smaller than that of the large diameter portion 9731.

When the fluid like water flows to the discharge pipe 973, accordingly, the fluid flowing the large diameter portion 9731 flows to the small diameter portion 9735. In this case, since the flow sectional area of the small diameter portion 9735 is smaller than that of the large diameter portion 9731, a relatively high pressure is applied to the large diameter portion 9731, and a relatively low pressure to the small diameter portion 9735.

According to the first embodiment of the present invention, the aeration device further includes an air adjusting valve 967. The air adjusting valve 967 is mounted on the air inflow unit 96, and in more detail, it is mounted on the inflow pipe 963. Of course, the air adjusting valve 967 may be mounted on the inflow tap 961 or the extension pipe 965, but desirably, it is mounted on the inflow pipe 963. The air adjusting valve 967 serves to control an amount of air introduced through the air inflow unit 96. The formation of the air adjusting valve 967 enables the amount of air introduced through the inflow pipe 963 to be controlled, thus efficiently conducting the aeration operation.

According to the first embodiment of the present invention, furthermore, the aeration device includes a mixing accelerating unit 939.

As shown in FIGS. 3 to 6, the aeration device according to the first embodiment of the present invention includes the auxiliary intake unit 99. The auxiliary intake unit 99 is located at the front side of the impeller 93 in such a manner as to be rotated unitarily with the driving shaft 9135 of the motor 913. A portion of the front side of the auxiliary intake unit 99 is inserted into the end portion of the rear side of the air inflow unit 96. If the air inflow unit 96 is provided with the extension pipe 965, a portion of the front side of the auxiliary intake unit 99 is inserted into the end portion of the rear side of the extension pipe 965. The auxiliary intake unit 99 serves to generate a flow through the rotation thereof so that the fluid flows backward in the air inflow unit 96.

The auxiliary intake unit 99 is extended from the front side of the impeller 93 to the interior of the extension pipe 965, and accordingly, it is rotated together with the driving shaft 9135 of the motor 913 and the impeller 93 so as to generate the flow of fluid toward the rear side of the extension pipe 965. The auxiliary intake unit 99 provides an additional intake force to the intake force generated by the rotation of the impeller 93, and serves to gently discharge the water filled in the air inflow unit 96 at the beginning of starting of the aeration device, in the backward direction. The auxiliary intake unit 99 is formed unitarily with the impeller 93 or may be fastened to the driving shaft 9135 of the motor 913 like a nut.

In the first embodiment of the present invention, a structure wherein the auxiliary intake unit 99 is formed unitarily with the impeller 93 has been explained, and in a second embodiment of the present invention as will be described later, a structure wherein the auxiliary intake unit 99 is fastened to the driving shaft 9135, while being not formed unitarily with the impeller 93, will be explained.

The auxiliary intake unit 99 includes an extension shaft 991 and an auxiliary impeller 992. The impeller 93 is provided with a support tap 933. The support tap 933 is located at the center of the impeller 93 and has a concave groove open at the rear side thereof. If the impeller 93 includes the rotary plate 931 and the rotary wings 932, the support tap 933 has the concave groove protruding forward from the center of the rotary plate 932 in such a manner as to be open at the rear side thereof, and the concave groove has a female screw portion screw-fastened to the end portion of the driving shaft 9135. The extension shaft 991 has a shape of a rod having a circular axial section in such a manner as to be extended forward from the support tap 933.

The auxiliary impeller 992 is located on the end portion of the front side of the extension shaft 991. The auxiliary impeller 992 may be formed unitarily with the end portion of the extension shaft 991 or separately from the extension shaft 991 in such a manner as to be fastened to the end portion of the extension shaft 991 by means of screw-fastening. The auxiliary impeller 992 has spiral wings adapted to generate a flow of fluid in an axial direction through the rotation thereof. The auxiliary impeller 992 is located inside the end portion of the rear side of the air inflow unit 96. The outer peripheral size of the auxiliary impeller 992 is smaller than the inner diameter of the air inflow unit 96. If the air inflow unit 96 has the extension pipe 965, the auxiliary impeller 992 is located inside the end portion of the rear side of the air inflow unit 96, and the outer peripheral size of the auxiliary impeller 992 is smaller than the inner diameter of the extension pipe 965.

FIGS. 6 and 7 show a variation example of the auxiliary intake unit 99 of FIG. 5. Referring first to FIG. 5, the auxiliary intake unit 99 has a shape of a nut in such a manner as to be screw-fastened to the driving shaft 9135 of the motor 913 protrudingly passing through the impeller 93. The impeller 93 has a center hole formed at the center of the rotary plate 931 to pass the driving shaft 9135 therethrough. The driving shaft 9135 of the motor 913 passes through the center hole of the rotary plate 931 and protrudes forward, and the auxiliary intake unit 99 is screw-fastened to the protruding driving shaft 9135. The auxiliary intake unit 99 includes the support tap 933, the extension shaft 991, and the auxiliary impeller 992.

The support tap 933 has the concave groove open at the rear side thereof in such a manner as to have a screw thread formed on the inner peripheral surface thereof. Further, the driving shaft 9135 has a screw thread formed on the outer peripheral surface thereof in such a manner as to be screw-fastened to the support tap 933. The extension shaft 991 is extended forward from the center of the support tap 933. The extension shaft 991 has the shape of a rod having a circular section. Also, the extension shaft 991 may have a spiral groove or protrusion so that the flow of fluid is generated backward during the rotation thereof.

The auxiliary impeller 992 is located on the end portion of the front side of the extension shaft 991 and has the wings. The auxiliary impeller 992 is formed unitarily with the end portion of the extension shaft 991 or separately from the extension shaft 991 in such a manner as to be fastened to the end portion of the extension shaft 991 by means of screw-fastening.

Referring to FIGS. 8 and 9, instead of the wings formed on the auxiliary impeller 992, a plurality of streamlined grooves is formed concavedly on the side surface of the auxiliary impeller 992. That is, the auxiliary impeller 992 has a cylindrical body extended to a given length from the rear side to the front side and the plurality of streamlined grooves formed on the side surface of the cylindrical body. Further, the auxiliary impeller 992 may have a streamlined vane structure in which plate-shaped members are crossedly twisted to each other in the radial direction.

The auxiliary impeller 992 has a smaller diameter than the extension pipe 965 in such a manner as to be inserted into the extension pipe 965 and may have linear sections on the axial sections thereof. That is, if both sides of the auxiliary impeller 992 are cut to have the linear sections on the side surfaces thereof, as shown in FIG. 8, there is provided a larger space between the inner diameter of the extension pipe 965 and the outer peripheral surface of the auxiliary impeller 992, thus improving the intake force of water.

Referring to FIGS. 10 to 13, variation examples of the discharge unit 97 will be explained. The discharge unit 97 is a hollow pipe connected to the discharge hole 923 formed on the outer peripheral surface of the mixing unit 92 and serves to discharge the air and water flowing through the discharge hole 923 of the mixing unit 92 therethrough. The discharge unit 97 includes a hollow discharge tap 971 coupled to the discharge hole 923 by means of screw-fastening and a discharge member 973 connected to the discharge tap 971. The discharge tap 971 may be not provided if necessary, and accordingly, the discharge member 973 may be connected to the discharge hole 923 of the mixing unit 92. The discharge tap 971 is coupled to the upper portion of the mixing unit 92, and the discharge member 973 is extended backward in the horizontal direction in the state of being coupled to the discharge tap 971 and thus extended long in the horizontal direction under the surface of water in adjacent to the surface of water.

The discharge member 973 includes a hollow pipe 9731 open on both ends thereof and a guide portion 9733 formed on one side end portion of the pipe 9731.

The end portion of the front side of the pipe 9731 is fastened to the end portion of the discharge tap 971. An injection hole 9739 is formed on the end portion of the rear side of the pipe 9731. Further, a sectional area reduction portion 9732 is formed on the rear side of the pipe 9731 so that an internal flow sectional area is decreased as the pipe 9731 goes toward the injection hole 9739. The internal flow sectional area on a portion of the front side of the pipe 9731 is formed to a constant size in the longitudinal direction thereof, and the sectional area reduction portion 9732 is formed on the rear side of the pipe 9731. The injection hole 9739 is formed on the rear side end portion of the sectional area reduction Portion 9732.

The flow sectional area of the injection hole 9739 is smaller than the internal flow sectional area of the front side of the pipe 9731 fastened to the discharge tap 971. As a result, when the fluid is discharged through the injection hole 9739 via the pipe 9731, the pressure of the fluid is increased in the pipe 9731 and the injection speed of the fluid from the injection hole 9739 is raised.

The sectional area reduction portion 9732 is formed by pressurizing both sides of the pipe 9731, and as the fluid goes toward the injection hole 9739, accordingly, the pressurized amount is increased so that the internal flow sectional area is decreased. The flow passage of the sectional area reduction portion 9732 may be circular, but if the sectional area reduction portion 9732 is formed by pressurizing both sides of the pipe 9731, the flow passage thereof has a similar shape to an oval so that it has a linear shape as it goes toward the rear side end portion thereof. The formation of the sectional area reduction portion 9732 allows the sectional area of the injection hole 9739 to be smaller than the inner sectional area of the pipe 9731.

The guide portion 9733 is extended backward from the rear side end portion of the cylindrical pipe 9731 in such a manner as to be bent from one side end portion in the radial direction of the pipe 9731 at which the injection hole 9739 is formed toward the other side of the pipe 9731. The guide portion 9733 is formed unitarily with the pipe 9731. The guide portion 9733 is spaced apart from the injection hole 9739 in the longitudinal direction of the pipe 9731 in such a manner as to cover the injection hole 9739 in the radial direction of the pipe 9731.

The guide portion 9733 serves to guide the flow direction of the fluid injected through the injection hole 9739 in the radial direction. The width of the guide portion 9733 is larger than the maximum width of the injection hole 9739. If the injection hole 9739 is circular, the width of the guide portion 9733 is larger than the diameter of the injection hole 9739.

The guide portion 9733 has a flat shape protruding in the outward radial direction from the cylindrical pipe 9731.

The injection hole 9739 having a flat shape large in the width direction and small in the height direction is formed between the inside surface of the guide portion 9733 and the end portion of the sectional area reduction portion 9732. The injection hole 9739 is formed on the end Portion of the sectional area reduction portion 9732 in such a manner as to face the inside surface of the guide portion 9733. The fluid flowing to the interior of the cylindrical pipe 9731 flows downward along the inside surface of the guide portion 9733 and is then discharged through the injection hole 9739 at a high pressure, while having the flow direction having the radial direction components along the bent inside surface formed up to the end portion of the guide portion 9733.

If it is assumed that the diameter of the cylindrical pipe 9731 is H1, the height of the injection hole 9739 is H2, and the width of the side direction of the injection hole 9739 is W, the internal sectional area A1 of the cylindrical pipe 9731 is calculated to $\pi \times (1/H1)^2$, and the internal sectional area A2 of the injection hole 9739 is to W×H2. The percentage of the internal sectional area A2 of the injection hole 9739 with respect to the internal sectional area A1 of the cylindrical pipe 9731 is in the range of 20 to 30%.

If the percentage of the internal sectional area A2 of the injection hole 9739 with respect to the internal sectional area A1 of the cylindrical pipe 9731 is less than 20%, a high pressure is formed inside the mixing unit 92 so that air and water are mixed with each Other, but the mixed air and water are not gently discharged, and contrarily, if the percentage is more than 30%, air and water are not mixed gently to decrease the wastewater treatment efficiencies. Accordingly, when the percentage of the internal sectional area A2 of the injection hole 9739 with respect to the internal sectional area A1 of the cylindrical pipe 9731 is in the range of 20 to 30%, air and water are mixed gently with each other and the sufficient amount of air and water mixed is discharged.

Further, a slit 9734 is formed in the longitudinal direction on the front side end portion of the cylindrical pipe 9731, that is, the opposite side end portion of the discharge hole. The slit 9734 is incised backward from the front side end portion of the cylindrical pipe 9731 in such a manner as to be open to a given length. When the cylindrical pipe 9731 is fastened to the discharge tap 971, the slit 9734 serves to allow an end portion 9711 of the discharge tap 971 to be gently inserted into the cylindrical pipe 9731. In the state where the cylindrical pipe 9731 is fastened to the end portion 9711 of the discharge tap 971, desirably, the outer periphery of the cylindrical pipe 9731 is compressedly fixed to the end portion 9711 of the discharge tap 971 by means of a band 9735.

FIGS. 14 and 15 are side sectional views showing the processes for manufacturing the discharge member of the aeration device according to the first embodiment of the present invention. Referring first to FIG. 14, a radial direction portion of one end of the cylindrical pipe 9731 in the longitudinal direction is cut off and removed to form a cut-off surface 974, and after the cut-off surface 974 is formed, as shown in FIG. 15, the cylindrical portion on which the cut-off surface 974 is formed is pressurized up and down and bent toward the center of the cylindrical portion. A cut-off piece 9741 having the cut-off surface 974 is bent toward the other side end portion 9742 and thus formed to the guide portion 9733.

Now, an explanation on the configuration and characteristics of an aeration device according to a second embodiment of the present invention will be given with reference to FIGS. 16 to 18. According to the second embodiment of the present invention, the aeration device includes: a hollow casing 91 having a motor 913 mounted therein; a mixing unit 92 formed on the front of the casing 91 in such a manner as to provide a space in which an inflow hole 941 is formed and having a plurality of protrusions 9731b contacted with a fluid; an impeller 93 located inside the mixing unit 92 and coupled to a driving shaft 9135 of the motor 913, the driving shaft 9135 being extended to the mixing unit 92, in such a manner as to be rotated unitarily with the driving shaft 9135, to generate a flow in an outward radial direction upon the rotation; an air inflow unit 96 having one side end portion located in front of the impeller 93 and serving as an air inflow pipe adapted to introduce air to the mixing unit 92; and a discharge unit 97 communicating with the mixing unit 92 to discharge the water and air mixed in the mixing unit 92 therethrough.

The detailed configuration of the aeration device according to the second embodiment of the present invention will be understood with reference to FIGS. 2 to 4, and for the brevity of the description, accordingly, different characteristics of the aeration device from those according to the first embodiment of the present invention will be described.

The mixing unit 92 has a circular section. The mixing unit 92 is formed unitarily with the casing 91 on the front of the casing 91. The mixing unit 92 may be separated from the casing 91. The mixing unit 92 is a space formed in front of the motor 912, and accordingly, the front portion of the casing 91 is concavedly open forward, which becomes the mixing unit 92. The mixing unit 92 is the space formed between the cylindrical portion concavedly open forward and the separator plate 94 coupled to the open portion of the cylindrical portion. Water and air are mixed in the mixing unit 92. The mixing unit 92 has a guide groove 923a concavedly formed on the rear side surface thereof in the circumferential direction thereof.

The guide groove 923a is formed on the periphery of the mixing unit 92 in the outward radial direction. The guide groove 923a is concavedly formed in a shape of an arch along the circumferential direction of the rear side periphery of the mixing unit 92. The guide groove 923a becomes deep and large as it goes toward a discharge hole 923. The protrusions 9731b are formed unitarily with the casing 91, so that they are formed protrudingly from the guide groove 923a. The protrusions 9731b are formed by means of protrusion members 975 inserted into the casing 91 in such a manner as to protrude from the guide groove 923a. The guide groove 923a communicates with a discharge pipe. The discharge hole is formed between the guide groove 923a and the discharge pipe. The guide groove 923a serves to guide the fluid so that the fluid flows to the discharge pipe. The protrusions 9731b serve as resistors against the water mixed with air.

As shown in FIGS. 19 and 20, the discharge pipe includes a large diameter portion 9731 and a small diameter portion 9735. The discharge pipe is located on the outer peripheral surface of the mixing unit 92. The discharge pipe communicates with the discharge hole 923 formed on the casing 91. The discharge pipe may be formed unitarily with the casing 91. The air and water flowing through the guide groove 923a of the mixing unit 92 are discharged through the discharge hole 923 and the discharge pipe. The large diameter portion 9731 and the small diameter portion 9735 are formed of hollow bodies 9731a whose one side and the other side are open. The large diameter portion 9731 has one or more protrusions 9731b formed on the inner peripheral surface thereof. The protrusions 9731b are formed by means of the insertion of the protrusion members 975 into the casing 91 from the outside. Further, the protrusions 9731b may be formed unitarily with the large diameter portion 9731. The discharge pipe has the large diameter portion 9731 formed on the front portion in the fluid flow direction and the small diameter portion 9735 formed on the rear portion in the fluid flow direction. The small diameter portion 9735 is connected to the other side outer periphery of the large diameter portion 9731 by means of welding, screw-fastening, and the like.

As shown in FIGS. 20 to 24, the discharge unit 97 has the plurality of protrusions 9731b formed thereon. The protrusions 9731b may be formed unitarily with the discharge unit 97, and otherwise, they may be formed by means of the protrusion members 975 inserted into the discharge unit 97 in such a manner as to protrude inward from the discharge unit 97. Each protrusion member 975 includes a head 9751, a body 9753 and a lower end portion 9755. The section of the lower end portion 9755 of the protrusion member 975 has a shape of a rectangle having two long sides 9755a and two short sides 9755b. Further, the center of each long side 9755a may be concavedly formed. The section of the lower end portion 9755 of the protrusion member 975 is not limited to the shapes as shown in FIGS. 23 and 24, and it may have a variety of shapes. The protrusion member 975 may be a screw nail or a screw. The protrusions 9731b mix the water and air mixed in the mixing unit 92 again to increase the mixing rate of the water and air. Accordingly, if the section of the lower end portion 9755 of the protrusion member 975 has various angles, the mixing rate of the water and air is more effectively obtained. In more detail, if the section of the lower end portion 9755 of the protrusion member 975 has various angles, the contact surfaces with the fluid are increased to accelerate the generation of vortexes, so that the water and air are mixed well to improve the mixing rate.

According to the second embodiment of the present invention, the aeration device further includes an air adjusting valve 967 mounted on the air inflow unit 96. The air adjusting valve 967 is mounted on the air inflow unit 96, and in more detail, it is mounted on an inflow pipe 963. Of course, the air adjusting valve 967 may be mounted on an inflow tap 961 or an extension pipe 965, but desirably, it is mounted on the inflow pipe 963. The air adjusting valve 967 serves to control an amount of air introduced through the air inflow unit 96. The formation of the air adjusting valve 967 enables the amount of air introduced through the inflow pipe 963 to be controlled, thus efficiently conducting the aeration operation.

According to the second embodiment of the present invention, as shown in FIGS. 25 to 28, the aeration device further includes a mixing accelerating unit 939.

The mixing accelerating unit 939 is located in front of the impeller 93 and fixedly coupled to the front end surfaces of rotary wings 932 of the impeller 93. The mixing accelerating unit 939 may be fixedly coupled to an extension shaft 991 of an auxiliary intake unit 99. The mixing accelerating unit 939 is rotated unitarily with the driving shaft 9135.

The mixing accelerating unit 939 has a shape of a disc having a given width in forward and backward directions and further has a plurality of through holes 9391 penetrated from the front to the rear. The mixing accelerating unit 939 has a shape of a mesh in such a manner as to form the plurality of through holes 9391 thereon. FIG. 28 is a separate perspective view showing a variation example of the impeller and the mixing accelerating unit of FIG. 26, and as shown in FIG. 28, the mixing accelerating unit 939 has a shape of a disc having the plurality of through holes 9391 punched thereon.

The mixing accelerating unit 939 is rotated unitarily with the driving shaft 9135 and the impeller 93, thus accelerating the mixing between the air introduced through the air inflow unit 96 and the water introduced into the intake housing 95 through the intake holes 951. The formation of the mixing accelerating unit 939 enables the water and air to be mixed well to improve the aeration efficiencies.

Other structures and characteristics of the aeration device according to the second embodiment of the present invention are the same as according to the first embodiment of the present invention, and for the brevity of the description, accordingly, they will be not explained anymore.

Now, as shown in FIG. 29, an explanation on the operating state of the aeration device according to the first embodiment of the present invention will be given. The aeration device is installed under water. One side end portion of the air inflow unit 96 is extended to the outside from the surface of water to introduce external air therethrough. If power is supplied to the motor 913 to rotate the driving shaft 9135, the driving shaft 9135 is rotated together with the impeller 93 and the auxiliary intake unit 99, so that the underwater water is introduced through the inflow holes 951, and at the same time, the water filled in the air inflow unit 96 flows backward and is then discharged through the air inflow unit 96.

The water introduced into the intake housing 95 through the intake holes 951 is introduced into the mixing unit 92 through the gap between the inflow hole 941 of the separator plate 94 and the extension pipe 965, and as the water filled in the air inflow unit 96 is discharged backward, air is introduced through the air inflow unit 96 and flows in the radial direction by means of the rotary wings 932. Accordingly, the air and water flows in the radial direction by means of the radial thrust of the impeller 93 caused by the rotation of the impeller 93, and they are discharged through the discharge hole 923.

The impeller 93 and the auxiliary intake unit 99 are rotated unitarily with the rotation of the driving shaft 9135 of the motor 913, and the auxiliary impeller 992 constituting the auxiliary intake unit 99 is rotated within the air inflow unit 96 to allow the fluid to flow backward within the air inflow unit 96. Further, the impeller 93 is rotated within the mixing unit 92 to allow the fluid to flow in the outward radial direction.

The air adjusting valve 967 mounted on the inflow pipe 963 adjusts the amount of air introduced through the inflow pipe 963. The air introduced through the inflow pipe 963 and the water introduced into the intake housing 95 through the intake holes 951 are mixed with each other by means of the rotation of the impeller 93, flow in the radial direction, and are then discharged through the discharge unit 97. The mixing accelerating unit 939 rotated together with the impeller 93 in front of the impeller 93 accelerates the mixing between the water and the air to improve the aeration performance.

The aeration device is installed under water, but of course, it may be installed out of water. In the same manner as mentioned above, in this case, the impeller 93 is rotated to introduce wastewater into the intake housing 95 through a separate pipe, and the wastewater is mixed with air and then discharged through the discharge unit 97.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The aeration device according to the present invention can strengthen the air intake force so as to suck the water filled in the inflow pipe introducing air at the beginning of starting, thus performing the aeration efficiently even in deep water, can locate air bubbles discharged together with the water in a downward direction, thus making the air stay under water for a long period of time, can mix the water and air mixed in the mixing unit again by means of the protrusions formed on the discharge unit, thus preventing the contact surfaces between the water and the air from being decreased during the discharging to increase an amount of dissolved oxygen, can control the amount of air introduced through the air adjusting valve, thus efficiently performing the aeration, and can increase the mixing rate between the water and the air, thus improving the aeration performance to allow aerobic microorganisms to be continuously cultivated and further to accelerate aerobic fermentation.

The invention claimed is:

1. An aeration device comprising:
   a hollow casing (91) having a motor (913) mounted therein;
   a mixing unit (92) formed on the front side of the casing (91) and having, a discharge hole (923) formed in a radial direction and an intake hole (941) formed on the front thereof;
   an impeller (93) located inside the mixing unit (92) and coupled to a driving shaft (9135) of the motor (913) in such a manner as to be rotated unitarily with the driving shaft (9135) to generate a flow in an outward radial direction upon the rotation, wherein the driving shaft (9135) is extended to the mixing unit (92);
   an air inflow unit (96) having one end portion located in front of the impeller (93) and serving as an air inflow pipe to introduce air to the mixing unit (92);
   a discharge unit (97) formed on the mixing unit (92) in such a manner as to communicate with the discharge hole (923); and
   an auxiliary intake unit (99) located on the front side of the impeller (93) in such a manner as to be rotated unitarily with the driving shaft (9135) of the motor (913) and adapted to be inserted into the air inflow unit (96) in such a manner as to allow fluid in the air inflow unit (96) to flow toward the impeller (93) upon the rotation,
   wherein the auxiliary intake unit (99) comprises:
   an extension shaft (991) extended from the impeller (93) into the air inflow unit (96); and
   an auxiliary impeller (992) located on the front end portion of the extension shaft (991), and located inside the air inflow unit (96),
   wherein the discharge unit (97) comprises a discharge member (973) having a hollow pipe (9731) open on both ends thereof, the hollow pipe (9731) having a sectional area reduction portion (9732) formed on the rear side thereof so that an internal flow sectional area is decreased as the hollow pipe (9731) goes toward the rear side thereof in the longitudinal direction thereof, and
   wherein the discharge member (973) comprises a guide portion (9733) extended backward from the rear side end portion of the hollow pipe (9731) on which an injection hole (9739) is formed, bent from one end portion in the radial direction of the hollow pipe (9731) toward the other end portion hereof, and guiding the fluid injected through the injection hole (9739) in such a manner as to allow the fluid to flow in the radial direction.

2. The aeration device according to claim 1, wherein:
   the impeller (93) comprises a support tap (933) protruding forward from the center thereof in such a manner that the end portion of the driving shaft (9135) is inserted thereinto, and
   the auxiliary intake unit (99) comprises the extension shaft (991) extended from the support tap (933), and the auxiliary impeller (992) located on the front end portion of the extension shaft (991).

3. The aeration device according to claim 1, wherein:
   the impeller (93) comprises a center hole formed on the center thereof in such a manner as to pass the driving shaft (9135) therethrough, and
   the auxiliary intake unit (99) comprises:
   a support tap (933) screw-fastened to the end portion of the driving shaft (9135) protruding forward after passing through the impeller (93);
   the extension shaft (991) extended from the support tap (933) in such a manner as to be formed unitarily with the support tap (933); and
   the auxiliary impeller (992) located on the front end portion of the extension shaft (991).

4. The aeration device according to claim 1, wherein the guide portion (9733) is extended in the radial direction of the hollow pipe (9731) to cover the injection hole (9739) and extended in the longitudinal direction of the hollow pipe (9731) in such a manner as to be spaced apart from the injection hole (9739).

5. The aeration device according to claim 1, wherein the discharge unit (97) comprises a slit (9734) formed in the longitudinal direction on the end portion opposite to the discharge hole of the hollow pipe (9731).

6. The aeration device according to claim 1, wherein the mixing unit (92) comprises a plurality of protrusions (9731b) protruding therefrom in such a manner as to come into contact with the fluid.

7. The aeration device according to claim 6, wherein the protrusions (9731b) are formed crossedly with respect to the flow direction of the fluid.

8. The aeration device according to claim 7, wherein the protrusions (9731b) are formed by inserting protrusion members (975) into the inside from the outside.

9. The aeration, device according to claim 8, wherein each of the protrusion members (975) comprises a lower end portion (9755) having a sectional shape of a rectangle having two long sides (9755*a*) and two short sides (9755*b*).

10. The aeration device according to claim 1, wherein the air inflow unit (96) comprises an air adjusting valve (967) adapted to control an amount of air introduced therethrough.

11. An aeration device comprising:
a hollow casing (91) having a motor (913) mounted therein;
a mixing unit (92) formed on the front side of the casing (91) and having a discharge hole (923) formed in a radial direction and an intake hole (941) formed on the front thereof;
an impeller (93) located inside the mixing unit (92) and coupled to a driving shaft (9135) of the motor (913) in such a manner as to be rotated unitarily with the driving shaft (9135) to generate a flow in an outward radial direction upon the rotation, wherein the driving shaft (9135) is extended to the mixing unit (92);
an air inflow unit (96) having one end portion located in front of the impeller (93) and serving as an air inflow pipe to introduce air to the mixing unit (92); and
an auxiliary intake unit (99) located on the front side of the impeller (93) in such a manner as to be rotated unitarily with the driving shaft (9135) of the motor (913) and adapted to be inserted into the air inflow unit (96) in such a manner as to allow fluid in the air inflow unit (96) to flow toward the impeller (93) upon the rotation,
wherein the auxiliary intake unit (99) comprises:
an extension shaft (991) extended from the impeller (93) into the air inflow unit (96);
an auxiliary impeller (992) located on the front end portion of the extension shaft (991), and located inside the air inflow unit (96); and
a discharge unit (97) formed on the mixing, unit (92) in such a manner as to communicate with the discharge hole (923),
wherein the discharge unit (97) comprises a hollow discharge pipe open on, one side and the other side thereof in such a manner as to communicate with the mixing unit (92) on one end thereof and to communicate with the outside on the other end thereof, the hollow discharge pipe having a plurality of protrusions protruding therefrom, and
wherein the mixing unit (92) comprises:
a plurality of protrusions (9731*b*) protruding therefrom in such a manner as to come into contact with the fluid; and
a guide groove (923*a*) formed concavedly on the rear side surface thereof in the circumferential direction thereof in such a manner as to communicate with the hollow discharge pipe, the guide groove (923*a*) having a plurality of protrusions protruding therefrom.

12. An aeration device comprising:
a hollow casing (91) having a motor (913) mounted therein;
a mixing unit (92) formed on the front side of the casing (91) and having a discharge hole (923) formed in a radial direction and an intake hole (941) formed on the front thereof;
an impeller (93) located inside the mixing unit (92) and coupled to a driving shaft (9135) of the motor (913) in such a manner as to be rotated unitarily with the driving shaft (9135) to generate a flow in an outward radial direction upon the rotation, wherein the driving shaft (9135) is extended to the mixing unit (92);
an air inflow unit (96) having one end portion located in front of the impeller (93) and serving as an air inflow pipe to introduce air to the mixing unit (92); and
an auxiliary intake unit (99) located on the front side of the impeller (93) in such a manner as to be rotated unitarily with the driving shaft (9135) of the motor (913) and adapted to be inserted into the air inflow unit (96) in such a manner as to allow fluid in the air inflow unit (96) to flow toward the impeller (93) upon the rotation,
wherein the auxiliary intake unit (99) comprises:
an extension, shaft (991) extended from the impeller (93) into the air inflow unit (96); and
an auxiliary impeller (992) located on the front end portion of the extension shaft (991), and located inside the air inflow unit (96),
wherein the air inflow unit (96) comprises an air adjusting valve (967) adapted to control an amount of air introduced therethrough, and
wherein the impeller (93) comprises a mixing accelerating unit (939) located in front thereof in, such a manner as to be rotated unitarily with the driving shaft (9135), the mixing accelerating unit (939) having a plurality of through holes (9391) penetrated from the front to the rear.

13. The aeration device according to claim 12, wherein the mixing accelerating unit (939) has a shape of a mesh.

14. The aeration device according to claim 12, wherein the impeller (93) comprises a disc-shaped rotary plate (931) and a plurality of rotary wings (932) protruding forward from the rotary plate (931), and the mixing accelerating unit (939) is fixedly coupled to the front end surfaces of rotary wings (932) of the impeller (93).

* * * * *